United States Patent [19]
Umezawa et al.

[11] Patent Number: 5,975,253
[45] Date of Patent: Nov. 2, 1999

[54] LINING FOR BRAKE BAND

[75] Inventors: Shigeki Umezawa; Toshiaki Wakisaka, both of Kanagawa, Japan

[73] Assignee: NSK-Warner Kabushiki Kaisha, Kanagawa, Japan

[21] Appl. No.: 08/127,123

[22] Filed: Sep. 27, 1993

Related U.S. Application Data

[63] Continuation of application No. 07/689,675, Apr. 23, 1991, abandoned, which is a continuation of application No. 07/399,040, Aug. 28, 1989, abandoned.

[30] Foreign Application Priority Data

Aug. 26, 1988 [JP] Japan .................................. 63-111232

[51] Int. Cl.$^6$ ..................................................... F16D 51/00
[52] U.S. Cl. ................ 188/77 R; 188/77 W; 188/264 B
[58] Field of Search .............................. 188/77 R, 77 W, 188/83, 249, 264 E, 264 B

[56] References Cited

U.S. PATENT DOCUMENTS

| | | | |
|---|---|---|---|
| Re. 16,028 | 3/1925 | Hoffman | 188/249 |
| 1,464,142 | 8/1923 | Smith | 188/264 B |
| 1,480,717 | 1/1924 | Fournier | 188/264 B |
| 1,498,877 | 6/1924 | Knee et al. | 188/264 B |
| 1,510,825 | 10/1924 | Bousquet | 188/264 B |
| 1,568,043 | 1/1926 | Anderson | 188/249 |
| 1,592,846 | 7/1926 | Greenleaf | 188/264 B |
| 3,347,345 | 10/1967 | Rogers et al. | 188/264 E |
| 4,787,483 | 11/1988 | Stefanutti | 188/77 W |

FOREIGN PATENT DOCUMENTS

| | | | |
|---|---|---|---|
| 0031283 | 3/1977 | Japan | 188/264 E |

*Primary Examiner*—Matthew C. Graham
*Attorney, Agent, or Firm*—Sughrue, Mion, Zinn, Macpeak & Seas, PLLC

[57] ABSTRACT

A lining for a brake band wherein brackets of the same shape or different shapes are connected respectively to opposite ends of a curved thin strap having an adhesive thereon, and a thin wet lining is bonded to an inner side of the curved strap, characterized in that cavities containing lubricating oil are formed in the lining.

10 Claims, 5 Drawing Sheets

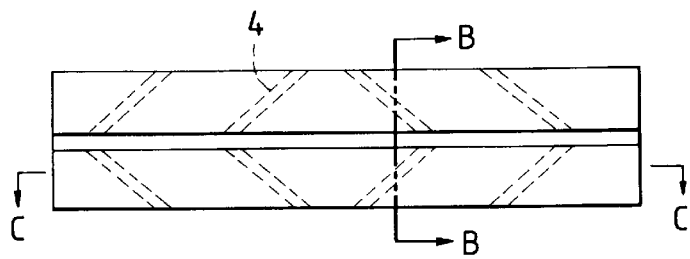
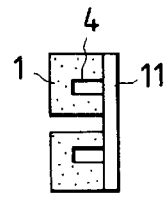
FIG. 7(a)  FIG. 7(b)
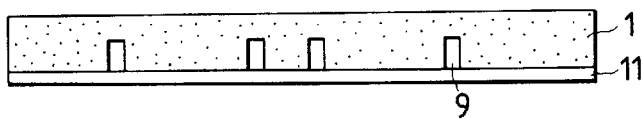
FIG. 7(c)
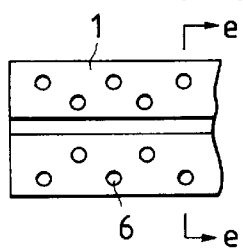
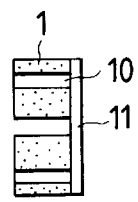
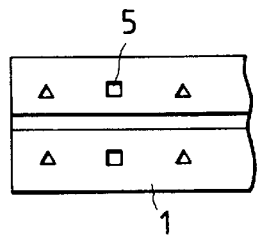
FIG. 8(a)  FIG. 8(b)  FIG. 9
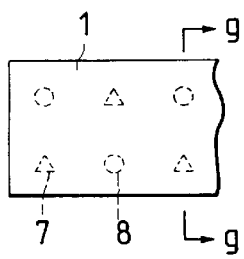
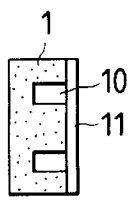
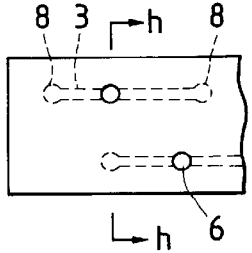
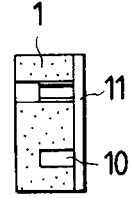
FIG. 10(a)  FIG. 10(b)  FIG. 11(a)  FIG. 11(b)

LINING FOR BRAKE BAND

This is a Continuation of application Ser. No. 07/689.675 filed Apr. 23, 1991, now abandoned, which is a continuation of application Ser. No. 07/339,040, filed Aug. 28, 1989, which was abandoned upon the filing hereof.

BACKGROUND OF THE INVENTION

This invention relates to a lining of a brake band used for a speed change gear for an automobile, an agricultural machine, a building machine and the like.

FIG. 15 is a perspective view showing a conventional brake band 20 which comprises a curved strap 11 and a lining 12 bonded to the inner surface of the strap by an adhesive. Reference numerals 13 and 14 denote mounting plates, reference numerals 15 and 16 brackets, and reference numeral 17 an oil hole. The lining 12 is made of a wet frictional material containing lubricating oil.

The brake band in an automatic speed change gear operates instantaneously (for about 0.5 to 1 seconds). At this time, although frictional heat is generated between the brake band and its mating drum, the lubricating oil contained in the wet frictional material (lining 12) oozes out from the interior of the lining as a result of elastical deformation or compression of the lining subjected to the friction, and the thus oozing lubricating oil disperses the frictional heat. This effect restrains a temperature rise of the frictional surface. However, with a higher output power and a higher rotational speed of an engine, the conditions of use of the brake band for the automatic speed change gear have been becoming severer. Under the circumstances, it has now been difficult for conventional lining materials to provide sufficiently satisfactory durability and speed change performance as required. Heretofore, the lining material itself has been modified in order to improve the durability of the brake band and a speed change performance. However, if there is no suitable material to meet the requirements a new material must be developed. However, the development of such a lining material requires much time and cost, and this cannot be achieved soon.

SUMMARY OF THE INVENTION

In the present invention, in order to overcome the deficiencies of the prior art, oil-containing cavities of desired shapes are formed in the lining itself, the cavities being through holes, non-through holes, grooves formed in the surface of the lining opposite to the strap in a circumferential direction or an axial direction, or a combination of the holes and the grooves.

BRIEF DESCRIPTION OF THE DRAWINGS

FIG. 7(a) is a plan view of a fifth embodiment;

FIG. 7(b) is a cross-sectional view taken along line B—B of FIG. 7(a);

FIG. 7(c) is a cross-sectional view taken along line C—C of FIG. 7(a);

FIG. 8(a) is a plan view of a sixth embodiment in which cavities are formed by holes;

FIG. 8(b) is a cross-sectional view taken along line e—e of FIG. 8(a);

FIG. 9 is a plan view of a seventh embodiment;

FIG. 10(a) is a plan view of a eighth embodiment;

FIG. 10(b) is a cross-sectional view taken along line g—g of FIG. 10(a);

FIG. 11(a) is a plan view of a nineth embodiment in which cavities are formed by a combination of holes and grooves;

FIG. 11(b) is a cross-sectional view taken along line h—h of FIG. 11(a);

DETAILED DESCRIPTION OF THE INVENTION

Figure 1:
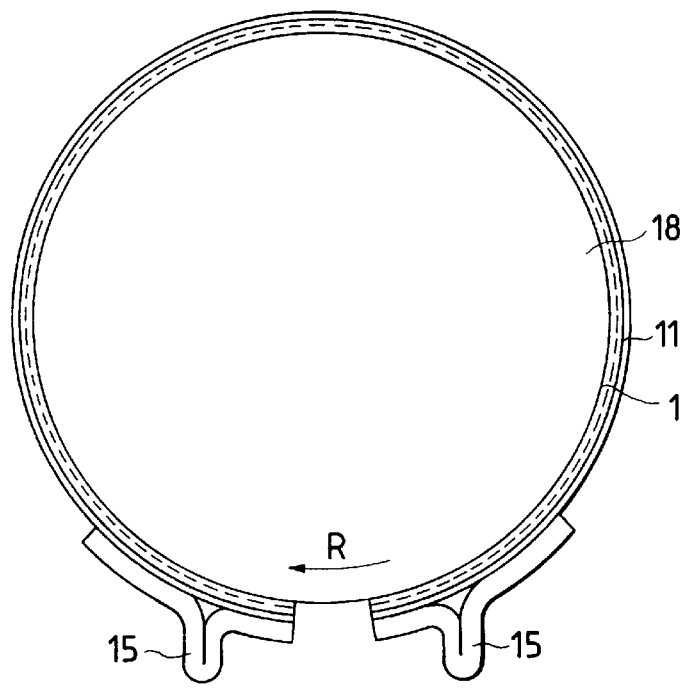
FIG. 1 is a front-elevational view of a brake band provided in accordance with the present invention.

FIG. 1 shows the manner of use of a brake band according to the present invention. A strap 11 is inwardly curved in surrounding relation to a brake drum 18, and a lining 1 is bonded to the inner side of the strap 11. In this Figure, an arrow R denotes the direction of rotation of the drum 18, and reference numeral 15 denotes a bracket.

Figure 2A:
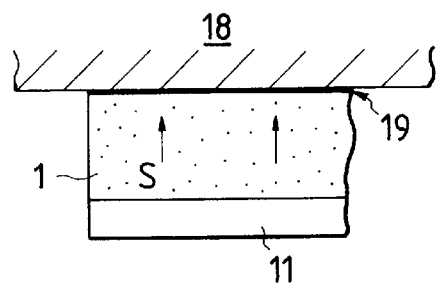
FIG. 2(a) is a view illustrating the flow of oil in a conventional brake band.
Figure 2B:
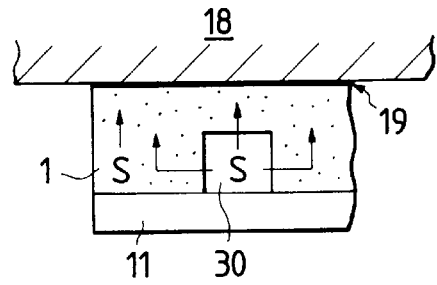
FIG. 2(b) is a view illustrating the flow of oil in the brake band of the present invention.

FIG. 2(a) shows the flow of oil in a conventional brake band. When a lining 1 is pressed against a brake drum 18 and is elastically deformed or compressed, the oil flows as indicated by arrow S to form an oil film 19, thereby dispersing the frinctional heat. However, as described above, with a higher power output and a higher rotational speed of an engine, the conditions of use of the brake band have been becoming severer. FIG. 2(b) shows the present invention, and where lubricating oil-containing cavities are formed in the lining, so that the oil contained in the lining itself and the oil held in the cavity 30 both flow as indicated by arrows S, thereby dispersing the frictional heat. Therefore, in this case, a higher cooling effect can be achieved than in the conventional brake band.

The frictional torque produced when the brake band is pressed against the rotating drum rotating inside the brake band so as to stop the drum, greatly differs depending on the conditions of use. Also, the frictional heat produced at this time differs greatly. Therefore, the shape, number and arrangement of the oil-containing cavities 30 are determined variously in accordance with the conditions of use.

Various preferred embodiments of the present invention will be described with reference to FIGS. 3 to 11.

Figure 3A:
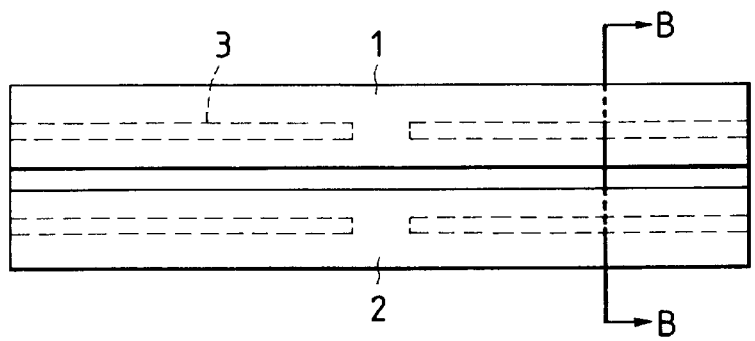
FIG. 3(a) is a plan view of a first embodiment of the invention.
Figure 3B:
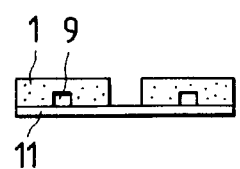
FIG. 3(b) is a cross-sectional view taken along line B—B of FIG. 3(a)

FIG. 3(a) is a plan view of a first embodiment, and FIG. 3(b) is a cross-sectional view taken along line B—B of FIG. 3(a). Reference numeral 1 denotes a lining, and reference numeral 3 denotes a discontinuous groove formed in the bonded surface of the lining 1 at which the lining is bonded to a strap 11. In FIG. 3(b), reference numeral 9 denotes the cross-sectional shape of the groove. Reference numeral 2 denotes a portion of the lining interrupting the grooves.

Figure 4A:
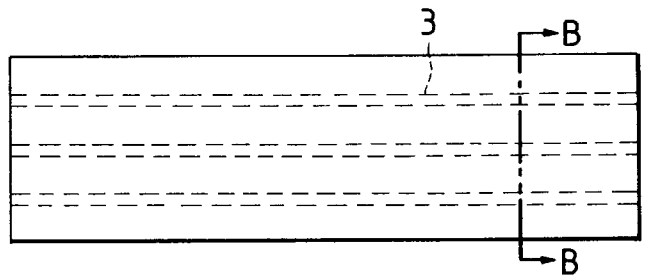
FIG. 4(a) is a plan view of a second embodiment.
Figure 4B:
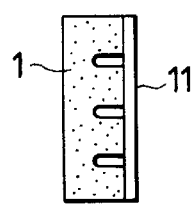
FIG. 4(b) is a cross-sectional view taken along line B—B of FIG. 4(a)

FIG. 4(a) shows a second embodiment which differs from the embodiment of FIG. 3 in that each groove 3 is continuous in the circumferential direction. FIG. 4(b) is a cross-sectional view taken along line B—B of FIG. 4(a).

Figure 5A:
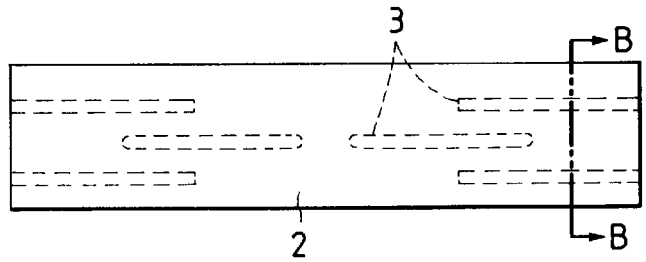
FIG. 5(a) is a plan view of a third embodiment.
Figure 5B:
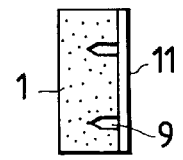
FIG. 5(b) is a cross-sectional view taken along line B—B of FIG. 5(a)

FIG. 5(a) is a plan view of a third embodiment in which short grooves 3 are provided between the discontinuous grooves 3 in staggered relation thereto. FIG. 5(b) is a cross-sectional view taken along line B—B of FIG. 5(a).

Figure 6A:
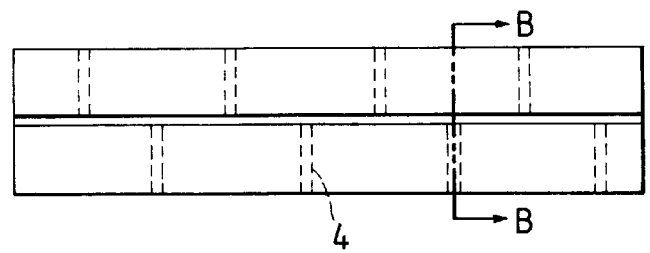
FIG. 6(a) is a plan view of a fourth embodiment.
Figure 6B:
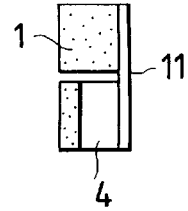
FIG. 6(b) is a cross-sectional view taken along line B—B of FIG. 6(a)

FIG. 6(a) is a plan view of a fourth embodiment in which grooves 4 are provided in the axial direction and disposed immediately adjacent to the strap 11. FIG. 6(b) is a cross-sectional view taken along line B—B of FIG. 6(a).

FIG. 7(a) is a plan view of a fifth embodiment which differs from the embodiment of FIG. 6 in that grooves 4 are provided obliquely relative to the axial direction. FIG. 7(b) is a cross-sectional view taken along line B—B of FIG. 7(a), and FIG. 7(c) is a cross-sectional view taken along line C—C of FIG. 7(a).

FIG. 8(a) is a plan view of a sixth embodiment in which the oil-containing cavities are not formed by the grooves but by holes 6 extending through the lining from its front surface to its reverse surface (that is, from the surface of the lining contacting with the drum 18 to the other surface bonded to the strap 11). FIG. 8(b) is a cross-sectional view taken along line e—e of FIG. 8(a). Reference numeral 10 denotes a cross-sectional shape of the hole 6.

FIG. 9 is plan view of a seventh embodiment in which through holes 5 are not circular but non-circular in cross-section.

FIG. 10(a) is a plan view of a eighth embodiment in which holes formed in the lining 1 are not extended through the lining and are disposed immediately adjacent to the strap 11. FIG. 10(b) is a cross-sectional view taken along line g—g of FIG. 10(a). Reference numeral 7 denotes a non-circular non-through hole, reference numeral 8 denotes a circular non-through hole, and reference numeral 10 denotes a cross-sectional shape of the hole.

FIG. 11(a) is a plan view of a nineth embodiment in which a cavity is formed by two holes 8 which are not extended through the lining, a through hole 6 disposed between the two holes 8, and grooves 3 each interconnecting the hole 6 and the hole 8. FIG. 11(b) is a cross-sectional view taken along line h—h of FIG. 11(a).

Figure 12A:
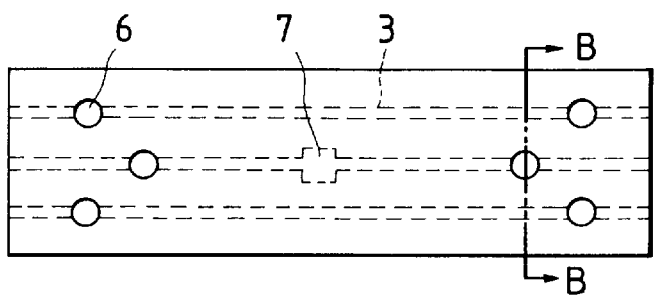
FIG. 12(a) is a plan view of a tenth embodiment.
Figure 12B:
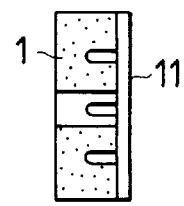
FIG. 12(b) is a cross sectional view taken along B—B of FIG. 12(a)

FIG. 12(a) is a plan view of a tenth embodiment in which cavities are formed by grooves 3 continuous in the circumferential direction, circular through holes 6 and a non-circular non-through hole 7. It is preferable to make the area of cavities larger at the center portion of the lining in view of the cooling effect and the durability. FIG. 12(b) is a cross-sectional view taken along line B—B of FIG. 12(a).

Figure 13A:
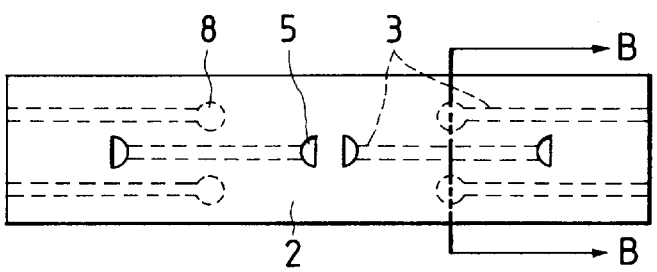
FIG. 13(a) is a plan view of a eleventh embodiment.
Figure 13B:
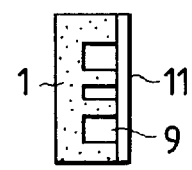
FIG. 13(b) is a cross-sectional view taken along line B—B of FIG. 13(a)

FIG. 13(a) is a plan view of a eleventh embodiment in which cavities are formed by discontinuous grooves 3, circular non-through holes 8 and non-circular through holes 5. FIG. 13(b) is a cross-sectional view taken alongline B—B of FIG. 13(a).

Figure 14A:
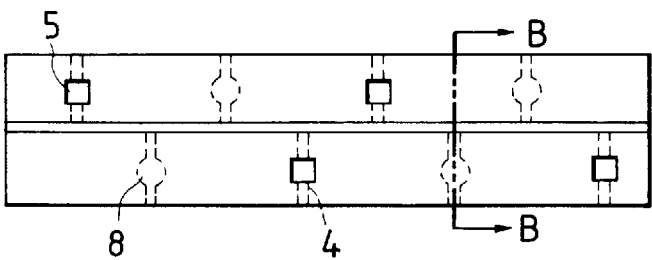
FIG. 14(a) is a plan view of a twelfth embodiment.
Figure 14B:
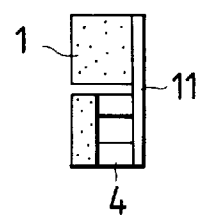
FIG. 14(b) is a cross-sectional view taken along line B—B of FIG. 14(a)
Figure 15:
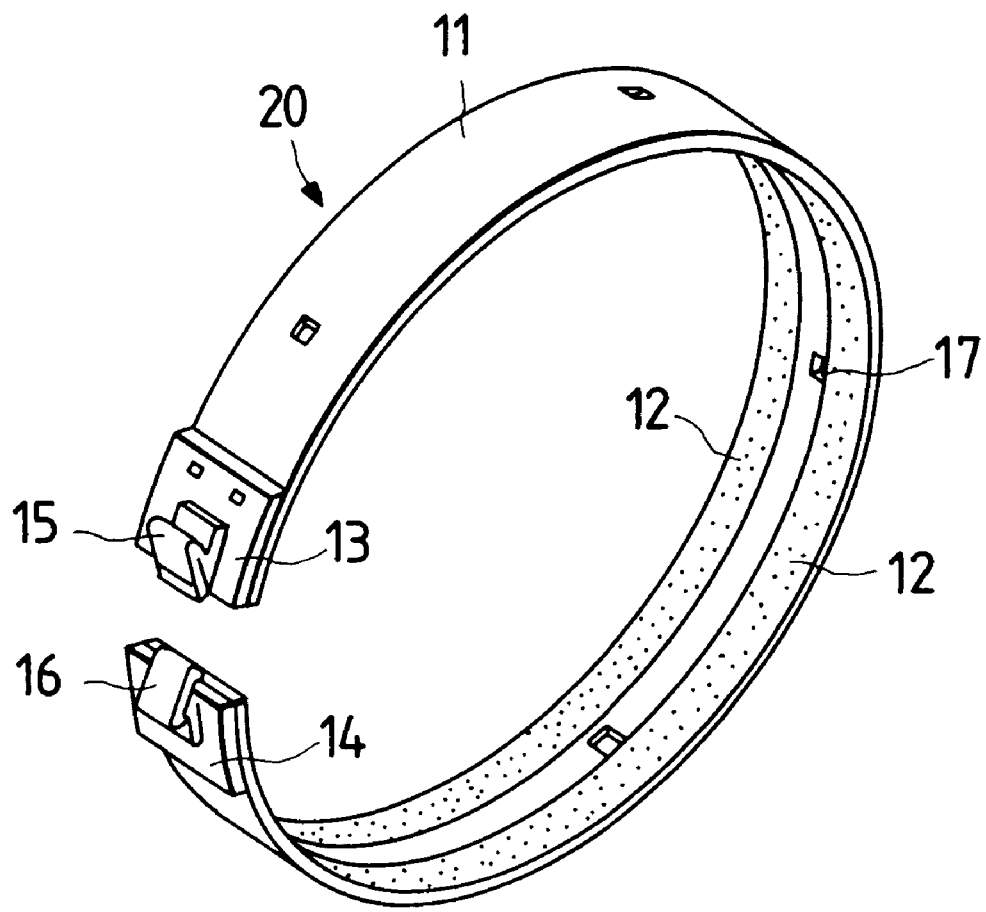
FIG. 15 is a perspective view of a conventional brake band.

FIG. 14(a) is a plan view of a twelfth embodiment in which cavities are formed by grooves 4 provided in the axial direction, non-circular through holes 5 and circular non-through holes 8. FIG. 14(b) is a cross-sectional view taken along line B—B of FIG. 14(a).

The lining for a brake band provided in accordance with the present invention are constructed as described above, and the desired shape, number and arrangement of the lubricating oil-containing cavities are formed in the lining itself. Therefore, the lining has a highly effective cooling effect.

What is claimed is:

1. A lining for a brake band which comprises a curved thin strap having an adhesive thereon, brackets of different shapes being connected respectively to opposite ends of said strap, and a thin wet lining being bonded, at a bonding surface thereof, to an inner side of said curved strap, wherein cavities for containing lubricating oil are formed in said lining at a side of said bonding surface and wherein one portion of each of said cavities is closed by said curved strap and remaining portions of each of said cavities are surrounded by said lining so that said lubricating oil is contained within said cavities, said cavities being sealed on said side that is bonded to said curved strap from an external oil source during operation.

2. A lining for brake band which comprises a curved thin strap having an adhesive thereon, brackets of the same shape being connected respectively to opposite ends of said strap, and a thin wet lining being bonded, at a bonding surface thereof, to an inner side of said curved strap, wherein cavities for containing lubricating oil are formed in said lining at a side of said bonding surface and wherein one portion of each of said cavities is closed by said curved strap and remaining portions of each of said cavities are surrounded by said lining so that said lubricating oil is contained within said cavities, said cavities being sealed on said side that is bonded to said curved strap from an external oil source during operation.

3. A lining for a brake band according to claim 2, in which said cavities comprise non-through holes and grooves, both formed in the bonded surface of said lining with respect to said strap.

4. A lining for a brake band according to claim 2, in which said cavities further comprise grooves formed in the bonded surface of said lining with respect to said strap.

5. A lining for a brake band according to claim 1 or claim 2, in which said cavities are a plurality of circular holes which are formed in the bonded surface of said lining with respect to said strap and are not extended through said lining.

6. A lining for a brake band according to claim 1 or claim 2, in which said cavities are grooves which are formed in the bonded surface of said lining with respect to said strap and are discontinuous in a circumferential directions.

7. A lining for a brake band according to claim 1 or claim 2, in which said cavities are grooves which are formed in the bonded surface of said lining with respect to said strap and are disposed in a staggered manner in an axial direction.

8. A lining for a brake band according to claim 1 or claim 2, in which said cavities are a plurality of non-circular holes which are formed in the bonded surface of said lining with respect to said strap and are not extended through said lining.

9. A lining for a brake band according to claim 1 or claim 2, in which said cavities are grooves which are formed in the bonded surface of said lining with respect to said strap and are continuous in a circumferential direction.

10. A lining for a brake band according to claim 1 or claim 2, in which said cavities are grooves which are formed in the bonded surface of said lining with respect to said strap and are disposed uniformly in an axial direction.

* * * * *